United States Patent [19]

Kalisz

[11] Patent Number: 4,600,171

[45] Date of Patent: Jul. 15, 1986

[54] AIRCRAFT STORES VERTICAL EXTENSION AND RETRACTION SYSTEM

[75] Inventor: John B. Kalisz, Newhall, Calif.

[73] Assignee: Lockheed Corporation, Burbank, Calif.

[21] Appl. No.: 660,174

[22] Filed: Oct. 12, 1984

[51] Int. Cl.⁴ .......................... B64D 1/08; B64D 9/00
[52] U.S. Cl. .............................. 244/137 A; 414/917; 89/1.59; 89/1.54
[58] Field of Search .......................... 74/103, 104, 105; 244/137 A; 414/463, 466, 495, 917, 751, 752; 173/38; 254/8 C, 9 B, 9 C, 10 B, 10 C; 89/1.54, 1.59

[56] References Cited

U.S. PATENT DOCUMENTS

| | | | |
|---|---|---|---|
| 1,743,542 | 1/1930 | Groenke | 254/10 C |
| 2,488,767 | 11/1949 | Drott et al. | 414/917 |
| 2,585,566 | 2/1952 | Lundstrom | 312/27 |
| 2,734,710 | 2/1956 | Noble | 248/276 |
| 2,766,007 | 10/1956 | Krilanovich | 254/124 |
| 2,785,807 | 3/1957 | Prowinsky | 414/917 |
| 2,920,773 | 1/1960 | Knabe | 414/917 |
| 2,921,501 | 1/1960 | Parot | 244/137 A |
| 3,153,286 | 10/1964 | Buisson | 33/168 |
| 3,273,459 | 9/1966 | Lardin | 244/137 A |
| 3,426,994 | 2/1969 | Daniel, Jr. | 248/277 |
| 3,828,862 | 8/1974 | Dabell et al. | 291/150 |
| 3,948,134 | 4/1976 | Mori | 83/625 |
| 4,054,185 | 10/1977 | Stedman | 414/917 |
| 4,243,189 | 1/1981 | Ohgi | 244/75 R |
| 4,263,960 | 4/1981 | Colombo | 164/416 |
| 4,335,315 | 6/1982 | Waerve et al. | 250/523 |
| 4,400,985 | 8/1983 | Bond | 74/103 |
| 4,522,548 | 6/1985 | Oswald et al. | 414/917 |

Primary Examiner—Galen L. Barefoot
Assistant Examiner—L. M. Fiorito
Attorney, Agent, or Firm—Louis L. Dachs

[57] ABSTRACT

The invention is an aircraft stores extension and retraction system 10 for raising and lowering stores mounted to a stores support assembly 69 along a substantially vertical path 94' of a specified length. The system 10 comprises first and second translating links 40A and 40B, each having first 42A, 42B, second 44A, 44B, and third 46A, 46B pivot supports, forming the corners of a right triangle. The second pivot supports 44A, 44B, are pivotally attached to stores support assembly 69. At least one connecting link 50 is pivotally attached at its first and second ends to the third pivot supports 46A, 46B of the first and second translating links 40A, 40B, respectively. First and second positioning links 30A, 30B are provided, each having first ends 32A, 32B and second ends 35A, 35B. The first ends 32A, 32B of the positioning links are pivotally attached to the structure 33 of the aircraft and the second ends 35A 35B are pivotally attached to the first pivot supports 42A, 42B of the first and second translating links 40A, 40B, respectively. At least one control link 60 is provided having first and second ends 62A 64A. The first end 64A of the at least one control link 60A is pivotally attached to the structure 33 of the aircraft and the second end 62A is pivotally attached to the third pivot support 46A of the first translating link 40A. Actuators 82 are coupled to the structure and the first and second positioning links 30A, 30B and are adapted to cause the positioning links 30A, 30B to pivot about their first ends. Thus, as the first and second positioning links 30A, 30B pivot, the second pivot supports 44A, 44B translate substantially along a vertical path 94.

4 Claims, 5 Drawing Figures

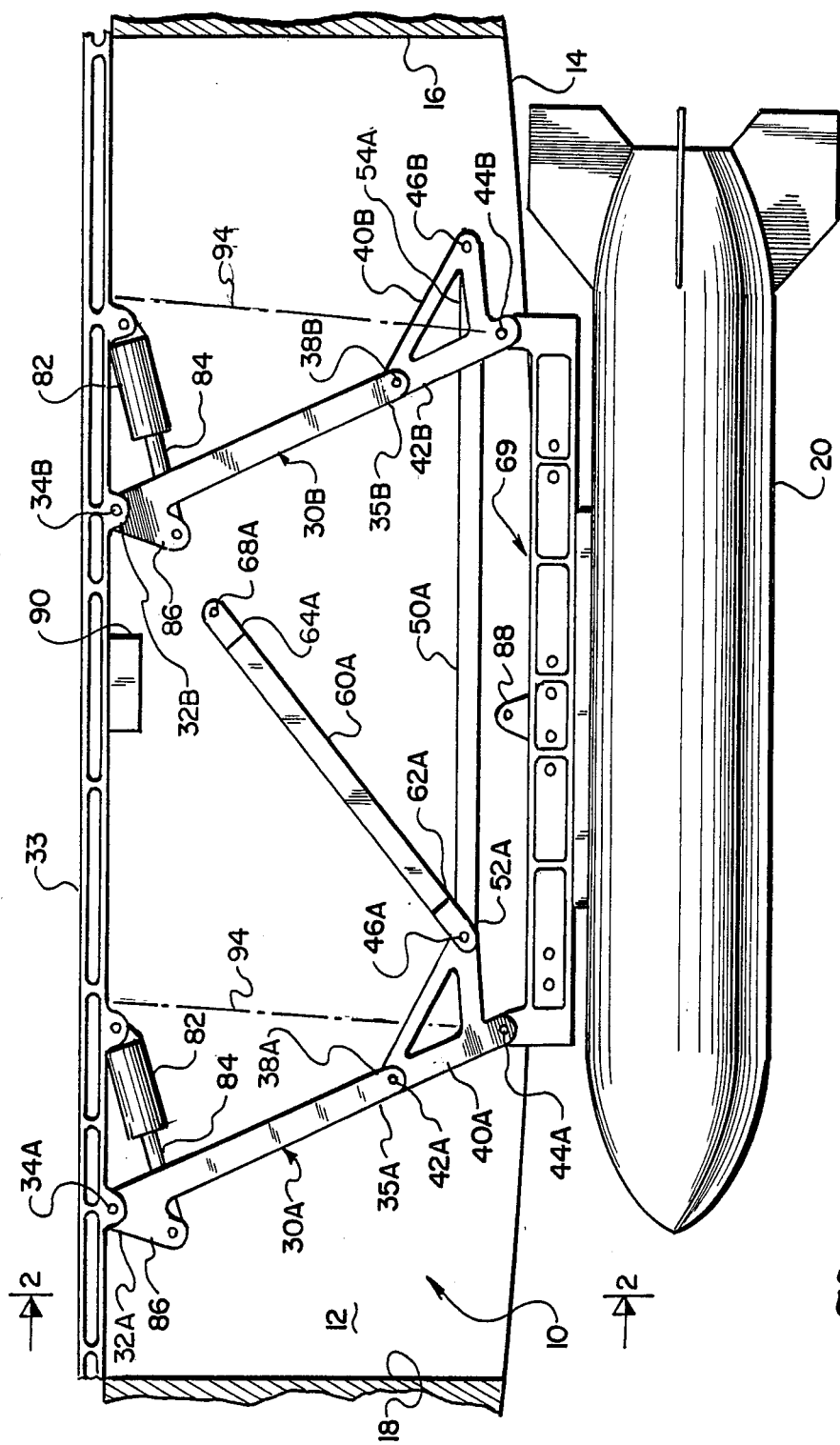

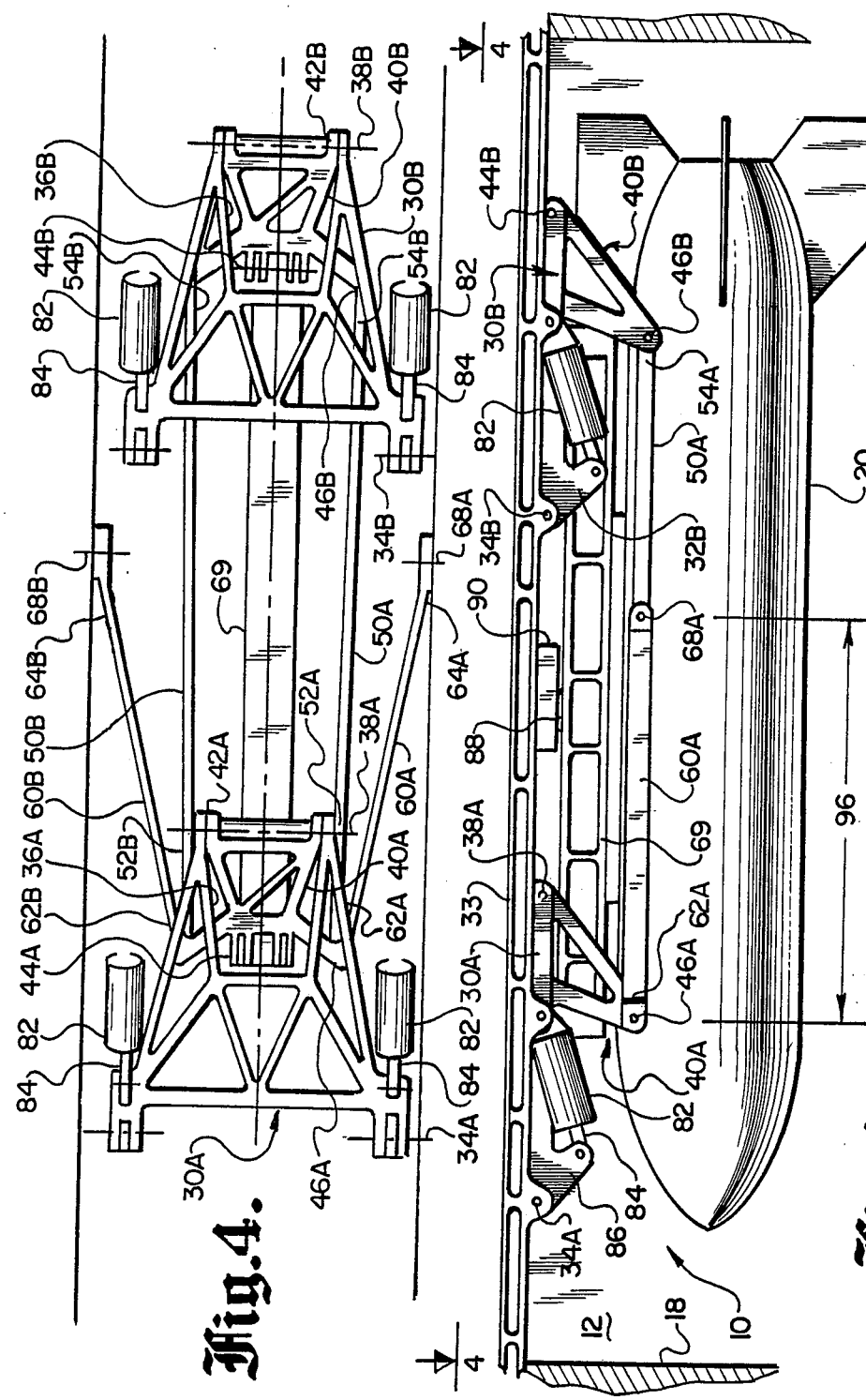

AIRCRAFT STORES VERTICAL EXTENSION AND RETRACTION SYSTEM

TECHNICAL FIELD

The invention relates to a stores extension and retraction system for extending weapons and the like from the interior of an aircraft to the exterior thereof and, in particular, to an extension and retraction system wherein the weapon is extended along a substantially vertical path.

BACKGROUND INFORMATION

With modern, high-speed military aircraft, accurate separation of internally stored weapons cannot be accomplished by conventional gravity release. Typically, the weapon has to be physically ejected from the aircraft with considerable force. This is particularly true if the aircraft is traveling at transonic or supersonic velocities because of the interference caused by shock waves which can deflect the weapon from its desired trajectory. Furthermore, if the weapon is a rocket-propelled missile, it must be extended or ejected clear of the aircraft's interior prior to ignition of the engine.

One of the problems caused by this requirement is that the bomb bay and the opening thereto must be sufficiently large enough to accommodate not only the weapon but any horizontal translation during extension and/or retraction thereof. Typical prior art designs suspend the weapon directly from beams pivotally mounted to the airframe which are rotated downward upon extension to put the weapon into the airstream. Unfortunately, this causes the weapon to travel a considerable horizontal distance and necessarily increases the length of the bomb bay. This reduces the space in the aircraft available for other equipment and/or fuel. Furthermore, drag is increased when the bomb-bay doors are extended, due to the larger opening. Thus, it becomes readily apparent that having an extension system that extends the weapon substantially in a vertical path, whether the weapon be a bomb or self-powered missile, would allow the use of a bomb bay with a minimum horizontal length for a weapon of a given length.

Patents showing extension and retraction systems discovered in our search of the prior art (none of which are considered pertinent) are as follows: U.S. Pat. No. 2,585,566, "Typewriter Cabinet" by C. B. Lundstrom; U.S. Pat. No. 2,734,710, "Supporting Mechanisms" by J. M. Noble; U.S. Pat. No. 2,766,007, "Camera Hoist" by S. Krilanovich; U.S. Pat. No. 3,426,994, "Straight Line Carrier Device" by J. A. Daniel, Jr.; U.S. Pat. No. 3,153,286, "Automatic Devices for Bringing a Measuring Gauge into the Position of Measurement and Withdrawing said Gauge from that Position" by P. Buisson; U.S. Pat. No. 3,828,862, "Travelling Overhead Carriage Mining Machine with Articulated, Tool Carrying Boom" by K. H. Dabell et al.; U.S. Pat. No. 3,948,134, "Machine Tool Driving Apparatus" by M. Mori; U.S. Pat. No. 4,243,189, "Temperature Stabilized Linkage" by G. Y. Ohgi; U.S. Pat. No. 4,263,960, "Rocking Device for Continuous Casting Molds" by P. Colombo; U.S. Pat. No. 4,335,315, "X-Ray Examination Apparatus" by H. Waerve et al., and U.S. Pat. No. 4,400,985, "Straight Line Link Mechanism" by I. D. Bond.

Therefore, it is a primary object of the subject invention to provide a simplified, vertical extension and retraction system for stores aboard an aircraft.

It is another object of the subject invention to provide a stores extension and retraction system that becomes locked in an over-center position when in the extended position, allowing for the absorption of upward, and fore and aft horizontal loads.

It is another object of the subject invention to provide an extension and retraction system for stores aboard an aircraft that, when in a retracted position, takes up a minimum amount of space within the stores compartment.

DISCLOSURE OF INVENTION

The invention is an aircraft stores extension and retraction system for raising and lowering stores mounted to a stores supporting assembly along a substantially vertical path of a specified length. The system comprises first and second translating links, each having first, second, and third pivot supports forming the corners of a right triangle. The second pivot supports are adapted to couple to the stores mounting assembly.

At least one connecting rod is pivotally attached at its first and second ends to the third pivot supports of the first and second translating links, respectively. First and second positioning links are provided, each having first and second ends. The first ends of the first and second positioning links are pivotally attached to the structure of the aircraft and the second ends are pivotally attached to the first pivot supports of the first and second translating links, respectively. At least one control link having first and second ends is provided. The first end of the at least one control link is pivotally attached to the structure of the aircraft and the second end is pivotally attached to the third pivot support of the first translating link.

Actuation means are coupled to the structure and the first and second positioning links which are adapted to cause the positioning links to pivot about their first ends. Thus, as the first and second positioning links rotate, the second pivot supports of the first and second translating links translate substantially along the vertical path.

Additionally, to minimize the space required for the system, the first and second pivot supports of the translating links are horizontally aligned and the second and third pivot supports are vertically aligned when the system is in the retracted position.

Preferably, given the length (L) of the vertical distance, the distances between the second pivot support and first and second pivot supports are 0.32 times L and 0.26 times L, respectively. The distance between the axis of rotation of the pivotally attached first and second ends of the positioning links are 0.79 times L. The distance between the pivotally attached ends of the at least one control link is 1.05 times L.

The novel features which are believed to be characteristic to the invention, both as to its organization and method of operation, together with further objects and advantages thereof, will be better understood from the following description connected with the accompanying drawings in which a presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a side-elevation view of the stores vertical extension and retraction system in the extended portions.

Illustrated in FIG. 2 is a front-elevation view of the system shown in FIG. 1 taken along the line 2—2.

Illustrated in FIG. 3 is a side-elevation view of the stores vertical extension and retraction system in the retracted position.

Illustrated in FIG. 4 is a top view of the system shown in FIG. 3 taken along the line 4—4.

Figure 5:
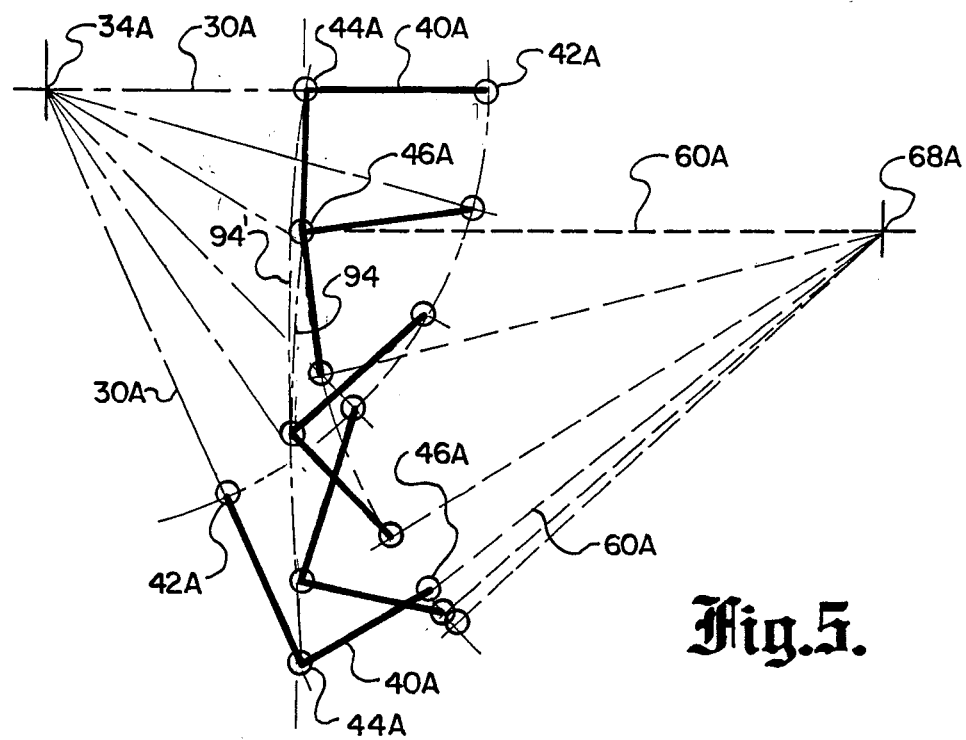
Figure 2:
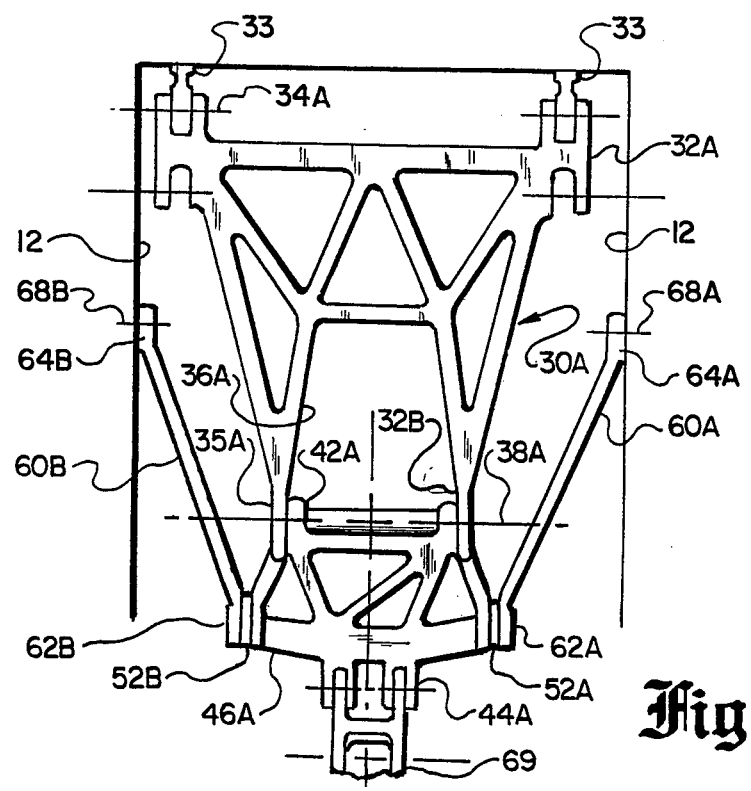

Illustrated in FIG. 5 is a schematic representation of the motion of the various links of the system during extension.

BEST MODE FOR CARRYING OUT THE INVENTION

Referring particularly to FIGS. 1-4, it can be seen that the system 10 is installed in the bomb bay 12 of an aircraft having a lower fuselage contour 14. The bomb bay 12 has an aft wall 16 and a forward wall 18 essentially defining the maximum length of the stores that can be installed therein, in this case, a missile 20.

The system 10 comprises first and second positioning Links 30A and 30B (in the form of webbed brackets) pivotally attached at their first ends 32A and 32B, respectively, to aircraft structure 33 and, thus, are rotatable about pivot axes 34A and 34B, respectively. The longitudinal spacing of the pivot axes 34A and 34B will depend upon the size of the bomb bay and missile, etc. The second ends 35A and 35B are in the form of clevises 36A and 36B, respectively.

First and second translating links 40A and 40B are pivotally attached at their first pivot supports 42A and 42B to the clevises 36A and 36B of the first and second positioning links 30A and 30B, respectively. The links 40A and 40B are generally triangular in shape when viewed from the side and web-like in construction. Thus, the pivot supports 42A and 42B are rotatable about pivot axes 38A and 38B of the positioning links 30A and 30B, respectively. The first and second translating links 40A and 40B incorporate second pivot supports 44A and 44B, respectively, and third pivot supports 46A and 46B, respectively. The pivot supports 42A, 44A, and 46A of translating link 40A and pivot supports 42B, 44B, and 46B of translating link 40B are in right-triangle relationships, as shown, with the second pivot supports 44A and 44B at the vertex of the 90° angle.

A pair of connecting links 50A and 50B are pivotally attached at their first ends 52A and 52B to the pivot support 46A of the translating link 40A. Their second ends 54A and 54B are pivotally attached to the third pivot support 46B of the second translating link 40B and are rotatable thereabout. Note that, in some instances, design requirements permitting, a single connecting link may suffice.

A pair of control links 60A and 60B are pivotally attached to the third pivot support 46A at their first ends 62A and 62B, respectively. Their second ends 64A and 64B are rotatably attached to the aircraft structure at pivot points 68A and 68B, respectively. Again, design requirements permitting, a single control link may suffice.

The second pivot supports 44A and 44B of the first and second translating links 40A and 40B, respectively, are pivotally attached to a stores support assembly 69.

The assembly 69 incorporates connections coupling the aircraft's programming, firing, and aiming circuits to the missile 20, as well as the missile releasing mechanism, and anti-sway braces, etc., none of which are either a part of this invention or shown herein.

Pivotally attached to structure 33 are four identical actuators 82, typically hydraulic, having piston rods 84, pivotally coupled to plurality of arms 86, one mounted on each side of each of the first and second positioning links 30A and 30B. Thus, extension or retraction of the piston rods 84 will cause the first and second positioning links 30A and 30B to rotate clockwise or counterclockwise, respectively, about pivot points 34A and 34B, lowering or raising the missile 20. It should be noted that, depending upon the size of the system 10, a single actuator may be sufficient.

When the missile 20 is in the retracted position (FIG. 3), a retraction pin assembly 88 mounted on the assembly 69 is engaged and locked in position by a restraining means 90 (details not shown) in the aircraft structure.

The ideal total extension and retraction vertical path is indicated by numeral 94 (FIGS. 1 and 3). It can be seen that when this path is vertical, the missile 20 can be almost as long as the total length of the bomb bay 12, as defined by forward and aft walls 18 and 16, respectively.

Still referring to FIGS. 1-4 and, in addition, to FIG. 5 which is a schematic representation of the motion of the various links of the system 10, it can be seen that during extension, the desirable substantially vertical path can be obtained by properly sizing the lengths of the first and second positioning links 30A and 30B, control links 60A and 60B, and proper selection of the distance between the first and second pivot supports 42A and 44A (as well as pivot supports 42B and 44B) and the distance between the second pivot supports 44A and third pivot supports 46A (as well as pivot supports 44B and 46B).

If the following relationships are held, the substantially vertical path, indicated by numeral 94', is obtained. While not exactly vertical, it is substantially so.

| | |
|---|---|
| Length of first and second positioning links 30A and 30B between pivot points 34A and 38A, and between 34B and 38B, respectively. = | 0.79 times length of vertical path 94 |
| Length of control links 60A and 60B between pivot points 62A and 64A, and between 62B and 64B, respectively, measured along line 96 (Shown in FIG. 3) which is parallel to plane of extension and retraction. = | 1.06 times length of vertical path 94 |
| Distance between pivot supports 42A and 44A and between 42B and 44B of translating links 40A and 40B, respectively. = | 0.32 times length of vertical path 94 |
| Distance between pivot supports 44A and 46A and between 44B and 46B of translating links 40A and 40B, respectively. = | 0.26 times length of vertical path 94 |

Not only will the above-stated ratios provide a substantially vertical path 94' (FIG. 5) but, when the extended position is reached (best seen in FIG. 1), the links 30A, 40A, and 60A, 60B are in an over-center relationship and any aft-directed, upward, or forward force applied to assembly 69 will be reacted through the links to the aircraft structure 33. Thus, no motion of the missile 20 can take place. This is an important feature since aerodynamic drag and the actual launch of the missile can generate sizeable forces on the system 10. Note that since the connecting links 50A and 50B couple control link 60A and 60B to translating link 40B and positioning link 30B, the over-center relationship is maintained at the rear of the assembly 69.

While the aircraft stores vertical extension and retraction system has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability primarily on military aircraft carrying internally stored weapons.

What is claim is:

1. An aircraft stores extension and retraction system for raising and lowering stores mounted to a stores supporting assembly along a substantially vertical path of a specified length comprising:
   first and second translating links each having first, second, and third pivot supports forming the corners of a right triangle, the stores supporting assembly coupled to each of said second pivot supports;
   at least one connecting rod pivotally attached at its first and second ends to said third pivot supports of the first and second translating links, respectively;
   first and second positioning links having first and second ends; said first ends of said positioning links being pivotally attached to the structure of the aircraft and said second ends of said positioning links being pivotally attached to said first pivot supports of said first and second translating links, respectively; and
   at least one control link having first and second ends, said first end pivotally attached to the structure of the aircraft and said second end pivotally attached to said third pivot support of said first translating link;
   such that as said positioning links pivot about their first ends, said second pivot supports translate substantially along a vertical path.

2. The system as set forth in claim 1 wherein at least one actuation means is coupled to at least one positioning link adapted to cause said at least one positioning link to pivot about its first end.

3. The system as set forth in claim 2 wherein:
   the distance between said second pivot support from said first and third pivot supports of said first and second translating links is substantially between 0.32 times and 0.26 times the specified length of the vertical path;
   the distance between the pivot axis of said first ends and said second ends of said positioning links is substantially 0.79 times the specified length of the vertical path; and
   the distance between the pivot axis of said first and second end of said at least one control links is substantially 1.09 times the specified length of the vertical path.

4. The system as set forth in claim 3 wherein the specified length of the vertical path is sufficient to allow said first and second positioning links, said at least one control link and said first and second translating links to reach an over-center position locking said system in the extended position.

* * * * *